US009549096B2

(12) United States Patent
Torigoshi et al.

(10) Patent No.: US 9,549,096 B2
(45) Date of Patent: Jan. 17, 2017

(54) IMAGE PROCESSING SYSTEM, RELAY SERVER, AND PROGRAM FOR RELAYING COMMUNICATIONS

(71) Applicant: Konica Minolta, Inc., Tokyo (JP)

(72) Inventors: Akihiro Torigoshi, Hyogo (JP); Kazumi Sawayanagi, Hyogo (JP); Masami Yamada, Osaka (JP); Hisashi Uchida, Kyoto (JP); Kazuya Anezaki, Hyogo (JP); Yasutaka Ito, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/789,730

(22) Filed: Jul. 1, 2015

(65) Prior Publication Data
US 2016/0006901 A1 Jan. 7, 2016

(30) Foreign Application Priority Data
Jul. 1, 2014 (JP) .................................. 2014-135569

(51) Int. Cl.
*H04N 1/327* (2006.01)
*H04L 12/24* (2006.01)
(Continued)

(52) U.S. Cl.
CPC .......... *H04N 1/32771* (2013.01); *H04L 41/24* (2013.01); *H04N 1/00244* (2013.01);
(Continued)

(58) Field of Classification Search
CPC ............ H04N 1/32771; H04N 1/00244; H04N 1/32786; H04N 1/32795
(Continued)

(56) References Cited

U.S. PATENT DOCUMENTS

2009/0248857 A1   10/2009   Murakami
2009/0307359 A1   12/2009   Akita et al.
(Continued)

FOREIGN PATENT DOCUMENTS

JP  H09-162908 A   6/1997
JP  2009-238098 A  10/2009
JP  2009-296473 A  12/2009

*Primary Examiner* — Jamares Q Washington
(74) *Attorney, Agent, or Firm* — Osha Liang LLP

(57) ABSTRACT

An image processing system includes: an application server located in the Internet; an image processing apparatus located in a local network connected to the Internet via a firewall; a relay server configured to relay communication between the image processing apparatus and the application server, the relay server being located in the local network; and a connection mediation server configured to transmit, to the relay server, a request for a connection to the application server, the connection mediation server being located in the Internet, wherein the connection mediation server includes a connection request transmitting unit so as to have communication established between the image processing apparatus and the application server, the relay server includes: a communication establishing unit; a job transferring unit; a job identifying unit; and a communication terminating unit, and after the communication terminating unit terminates the communication, the communication establishing unit reestablishes the communication.

18 Claims, 11 Drawing Sheets

(51) Int. Cl.
  *H04N 1/00*     (2006.01)
  *H04N 1/32*     (2006.01)
(52) U.S. Cl.
  CPC ..... *H04N 1/32545* (2013.01); *H04N 1/32786* (2013.01); *H04N 1/32793* (2013.01); *H04N 2201/0094* (2013.01)
(58) Field of Classification Search
  USPC .............................. 358/1.15; 709/203, 218
  See application file for complete search history.

(56) References Cited

U.S. PATENT DOCUMENTS

| | | | | |
|---|---|---|---|---|
| 2010/0268832 | A1* | 10/2010 | Lucas | H04L 65/1043 709/228 |
| 2012/0293837 | A1* | 11/2012 | Mori | H04N 1/00464 358/1.15 |
| 2014/0118789 | A1* | 5/2014 | Kadota | G06F 3/121 358/1.15 |

* cited by examiner

| SERVER CONNECTION INFORMATION | | DEVICE CONNECTION INFORMATION | |
|---|---|---|---|
| CONNECTION ID | 001 | | |
| APPLICATION ADDRESS | 192.168.1.1 | DEVICE ADDRESS | 192.168.10.1 |
| APPLICATION PORT NUMBER | 52002 | DEVICE PORT NUMBER | 50001 |
| CONNECTION FLAG | ON | | |
| CONNECTION ID | 002 | | |
| APPLICATION ADDRESS | 192.168.1.1 | DEVICE ADDRESS | 192.168.10.2 |
| APPLICATION PORT NUMBER | 52001 | DEVICE PORT NUMBER | 50002 |
| CONNECTION FLAG | OFF | | |

29a — Server Connection Information
29b — Device Connection Information

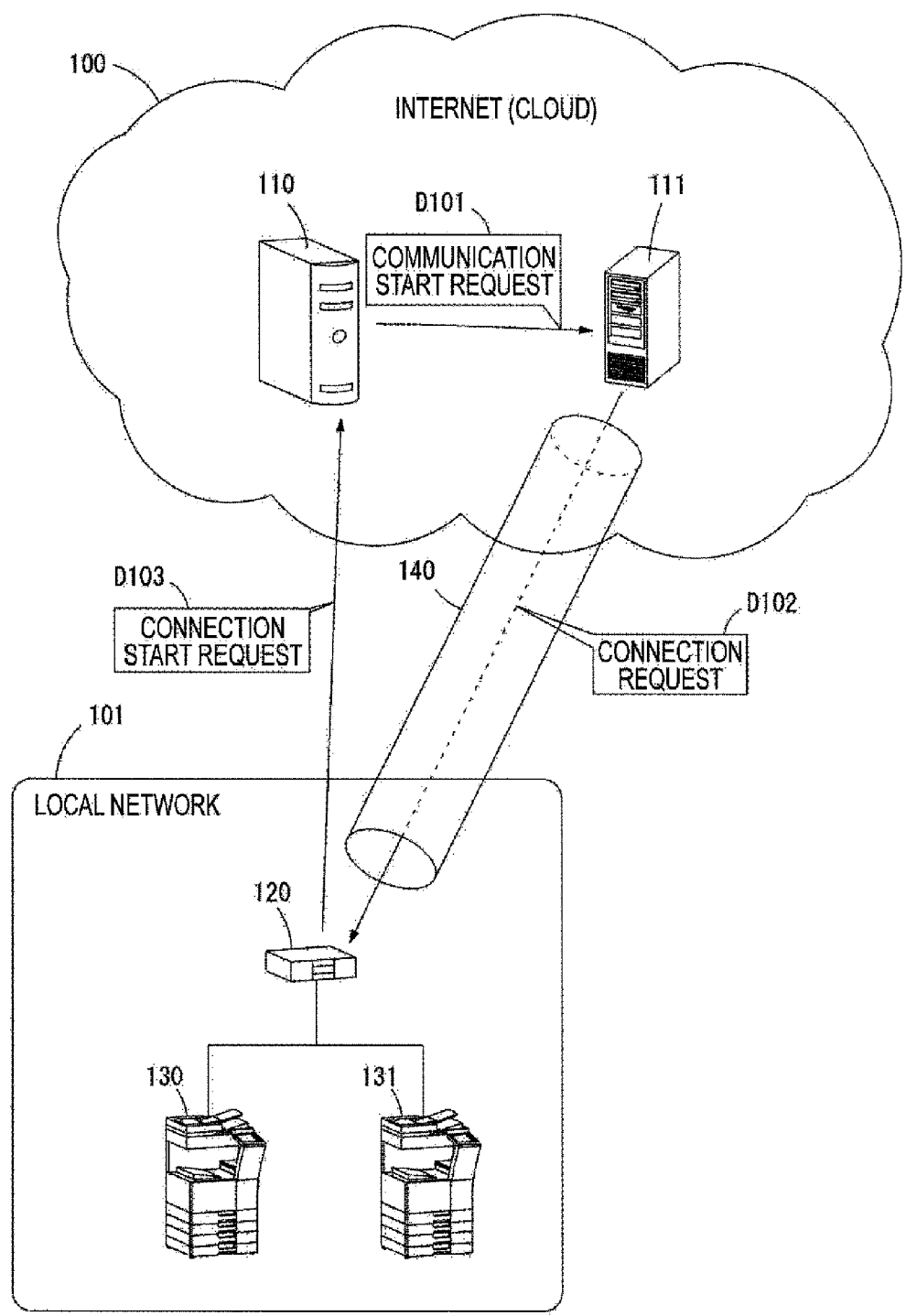

IMAGE PROCESSING SYSTEM, RELAY SERVER, AND PROGRAM FOR RELAYING COMMUNICATIONS

The entire disclosure of Japanese Patent Application No. 2014-135569 filed on Jul. 1, 2014 including description, claims, drawings, and abstract are incorporated herein by reference in its entirety.

BACKGROUND OF THE INVENTION

Field of the Invention

One or more embodiments of the invention relate to an image processing system, a relay server, and a program, and more particularly, to a technology for relaying communication between a server located in the Internet and an image processing apparatus.

Description of the Related Art

Various application servers for SaaS (Software as a Service) applications and the like are located in a cloud in the Internet, and cloud services are provided by the application servers via the Internet these days. A cloud service offers high convenience, as it can be used at anytime from anywhere as long as Internet access is available. In an example of use of a cloud service, the data of documents or the like is stored in an application server, and the data is transferred from the application server to an image processing apparatus located in an intra-company local network, and is printed out.

However, there is a firewall existing between a local network and the Internet. Therefore, when a user issues a job execution instruction to an application server, data is not transferred from the application server in the Internet to an image processing apparatus or the like located in a local network. In view of this, an image processing system shown in FIG. 11 has been suggested so as to realize such data transfer, for example.

The conventional image processing system shown in FIG. 11 includes an application server 110 in the Internet 100, and a connection mediation server 111 cooperating with the application server 110. Meanwhile, in a local network 101 such as an intra-company LAN (Local Area Network), a relay server 120 and image processing apparatuses 130 and 131 are located, for example. There may be only a single image processing apparatus in the local network 101. The relay server 120 is a server that relays communication between the image processing apparatuses 130 and 131 and the application server 110. When activated by a power supply, this relay server 120 establishes a connection 140 to the connection mediation server 111 located in the Internet 100. With this, the connection mediation server 111 becomes able to constantly communicate with the relay server 120 located in the local network 101 over a firewall.

In this image processing system, when the application server 110 transmits a job to the image processing apparatus 130 located in the local network 101, for example, the application server 110 first transmits a communication start request D101 designating the image processing apparatus 130 to the connection mediation server 111. Receiving the communication start request D101, the connection mediation server 111 identifies the relay server 120 that manages the image processing apparatus 130 based on information registered in advance, and transmits a connection request D102 to the relay server 120. This connection request D102 contains address information for connecting to the application server 110, and the like. Receiving the connection request D102 from the connection mediation server 111, the relay server 120 transmits a connection start request D103 to the application server 110 based on the address information and the like contained in the connection request D102. With this, the relay server 120 and the application server 110 are connected, and the application server 110 becomes able to start job transmission to the relay server 120 located in the local network 101. When the job transmission from the application server 110 is completed, the relay server 120 transfers the job received from the application server 110 to the image processing apparatus 130. In this manner, the image processing apparatus 130 becomes able to receive a job transmitted from the application server 110 via the relay server 120, and perform image processing based on the job.

In the above described image processing system, however, all the jobs that are transmitted from a server or the like outside the local network 101 to an image processing apparatus or the like in the local network 101 are relayed by the relay server 120. So as to cause the relay server 120 to achieve a certain processing capacity, there is an upper limit on the number of connections the relay server 120 can establish with a server or the like outside the local network 101, such as the application server 110. If the number of connections between the relay server 120 and the application server 110 is the upper limit, a new connection for transmitting a job cannot be established between the application server 110 and the relay server 120 even when a user issues a job transmission instruction designating the image processing apparatus 130 to the application server 110. In that case, the user has to wait until the relay server 120 becomes able to establish a new connection as the currently-executed job is completed, for example. Therefore, a long period of time might be required for executing a new job. Furthermore, during the period between transmission of a job to the image processing apparatus 130 and completion of execution of the job in the image processing apparatus 130, maintaining a connection between the application server 110 and the relay server 120 even when there is no transmission/reception of data or the like between the two servers is inappropriate in terms of effective use of communication.

In view of this, JP 2009-296473A discloses an image forming apparatus that has a server cooperation function to transmit data to a server and cause the server to process the data. In this image forming apparatus, the connection to the server is temporarily terminated after data is transmitted to the server. When the processing by the server is completed, the server transmits a connection request to the image forming apparatus, so that data can be transmitted from the server to the image forming apparatus. In the above described image processing system, however, there is a firewall existing between a local network and the Internet as described above. Therefore, a connection request cannot be transmitted from the server to the image forming apparatus of JP 2009-296473 A, and the technology disclosed in JP 2009-296473 A cannot be applied to the above described image processing system.

SUMMARY OF THE INVENTION

One or more embodiments of the invention may provide an image processing system that can efficiently transmit a job or the like from an application server and effectively use communication, a relay server, and a program.

In accordance with one or more embodiments of the invention, an image processing system comprises: an application server located in the Internet; an image processing apparatus located in a local network connected to the Internet via a firewall; a relay server configured to relay communication between the image processing apparatus and the application server, the relay server being located in the local network; and a connection mediation server configured to transmit, to the relay server, a request for a connection to the application server, the connection mediation server being located in the Internet, wherein the connection mediation server includes a connection request transmitting unit configured to transmit a connection request to the relay server when receiving a communication start request designating the image processing apparatus from the application server, so as to have communication established between the image processing apparatus and the application server, the relay server includes: a communication establishing unit configured to establish the communication by connecting to the application server in accordance with the connection request from the connection mediation server; a job transferring unit configured to transfer a job received from the application server to the image processing apparatus; a job identifying unit configured to identify a type of the job; and a communication terminating unit configured to terminate the communication when there is no transmission/reception being performed between the application server and the relay server in accordance with the job type identified by the job identifying unit, and after the communication terminating unit terminates the communication, the communication establishing unit reestablishes the communication by connecting to the application server after receiving data to be transmitted to the application server from the image processing apparatus, and transfers the data.

According to an invention of Item. 2, in the image processing system of Item. 1, the communication terminating unit terminates the communication when determining that a predetermined time or longer is required between the transfer of the job to the image processing apparatus and the reception of the data.

According to an invention of Item. 3, in the image processing system of Item. 1 or 2, the communication terminating unit terminates the communication, without notifying the application server.

According to an invention of Item. 4, in the image processing system of Item. 3, the communication establishing unit generates a socket for connecting to the application server based on reception of the connection request from the connection mediation server and establishes the communication, and the communication terminating unit terminates the communication by discarding the socket.

According to an invention of Item. 5, in the image processing system of Item. 3 or 4, the communication establishing unit reestablishes the communication, without notifying the application server.

According to an invention of Item. 6, in the image processing system of any one of Items. 1 to 5, the relay server further includes a storage unit that stores server connection information identifying the application server to be connected to in accordance with the connection request, and device connection information identifying the image processing apparatus to be connected to for transferring the job received from the application server, the server connection information and the device connection information being associated with each other. When receiving a notification of completion of the job from the image processing apparatus identified by the device connection information, the communication establishing unit reestablishes the communication by connecting to the application server based on the server connection information stored and associated with the device connection information in the storage unit.

In accordance with one or more embodiments of the invention, a relay server that is located in a local network connected to the Internet via a firewall, connects to a connection mediation server located in the Internet, connects to an application server located in the Internet based on a connection request received from the connection mediation server, and relays communication between an image processing apparatus located in the local network and the application server, the relay server reflecting one aspect of the present invention comprises: a communication establishing unit configured to establish communication between the image processing apparatus and the application server by connecting to the application server in accordance with the connection request from the connection mediation server; a job transferring unit configured to transfer a job received from the application server to the image processing apparatus; a job identifying unit configured to identify a type of the job; and a communication terminating unit configured to terminate the communication when there is no transmission/reception being performed between the application server and the relay server in accordance with the job type identified by the job identifying unit, wherein, after the communication terminating unit terminates the communication, the communication establishing unit reestablishes the communication by connecting to the application server after receiving data to be transmitted to the application server from the image processing apparatus, and transfers the data.

According to an invention of Item. 8, in the relay server of Item. 7, the communication terminating unit terminates the communication when determining that a predetermined time or longer is required between the transfer of the job to the image processing apparatus and the reception of the data.

According to an invention of Item. 9, in the relay server of Item. 7 or 8, the communication terminating unit terminates the communication, without notifying the application server.

According to an invention of Item. 10, in the relay server of Item. 9, the communication establishing unit generates a socket for connecting to the application server based on reception of the connection request from the connection mediation server and establishes the communication, and the communication terminating unit terminates the communication by discarding the socket.

According to an invention of Item. 11, in the relay server of any one of Items. 7 to 10, the communication establishing unit reestablishes the communication, without notifying the application server.

According to an invention of Item. 12, in the relay server of any one of Items. 7 to 11, the relay server further includes a storage unit that stores server connection information identifying the application server to be connected to in accordance with the connection request, and device connection information identifying the image processing apparatus to be connected to for transferring the job received from the application server, the server connection information and the device connection information being associated with each other. When receiving a notification of completion of the job from the image processing apparatus identified by the device connection information, the communication establishing unit reestablishes the communication by connecting to the application server based on the server connection information stored and associated with the device connection information in the storage unit.

In accordance with one or more embodiments of the invention, a non-transitory recording medium storing a computer readable program that is a program to be executed by a computer functioning as a relay server that is located in a local network connected to the Internet via a firewall, connects to a connection mediation server located in the Internet, connects to an application server located in the Internet based on a connection request received from the connection mediation server, and relays communication between an image processing apparatus located in the local network and the application server, the program reflecting one aspect of the present invention causes the computer to carry out: (a) the step of establishing communication between the image processing apparatus and the application server by connecting to the application server in accordance with the connection request from the connection mediation server; (b) the step of transferring a job received from the application server to the image processing apparatus; (c) the step of identifying a type of the job; (d) the step of terminating the communication when there is no transmission/reception being performed between the application server and the relay server in accordance with the job type identified in the step (c); and (e) the step of reestablishing the communication to transfer data to the application server by connecting to the application server after terminating the communication in the step (d) and receiving the data from the image processing apparatus.

According to an invention of Item. 14, in the non-transitory recording medium storing a computer readable program of Item. 13, when determining that a predetermined time or longer is required between transfer of the job to the image processing apparatus and reception of the data in the step (d), the computer terminates the communication.

According to an invention of Item. 15, in the non-transitory recording medium storing a computer readable program of Item. 13, in the step (d), the computer terminates the communication, without notifying the application server.

According to an invention of Item. 16, in the non-transitory recording medium storing a computer readable program of Item. 15, in the step (a), the computer generates a socket for connecting to the application server based on reception of the connection request from the connection mediation server, and establishes the communication, and, in the step (d), the computer terminates the communication by discarding the socket.

According to an invention of Item. 17, in the non-transitory recording medium storing a computer readable program of Item. 15, in the step (e), the computer reestablishes the communication, without notifying the application server.

According to an invention of Item. 18, in the non-transitory recording medium storing a computer readable program of Item. 13, the program further causes the computer to carry out (f) the step of storing server connection information identifying the application server to be connected to in accordance with the connection request, and device connection information identifying the image processing apparatus to be connected to for transferring the job received from the application server, the server connection information and the device connection information being associated with each other, and, in the step (e), when receiving a notification of completion of the job from the image processing apparatus identified by the device connection information, the computer reestablishes the communication by connecting to the application server based on the server connection information stored and associated with the device connection information in the storage unit.

BRIEF DESCRIPTION OF THE DRAWINGS

Advantages and features of embodiments of the invention will become more fully understood from the detailed description given hereinbelow and the appended drawings which are given by way of illustration only, and thus are not intended as a definition of the limits of the invention, and wherein:

FIG. 4 is a diagram showing an example of a control table stored in the relay server in accordance with one or more embodiments of the invention;

FIG. 11 is a diagram showing a conventional image processing system.

DETAILED DESCRIPTION OF EMBODIMENTS

Figure 1:
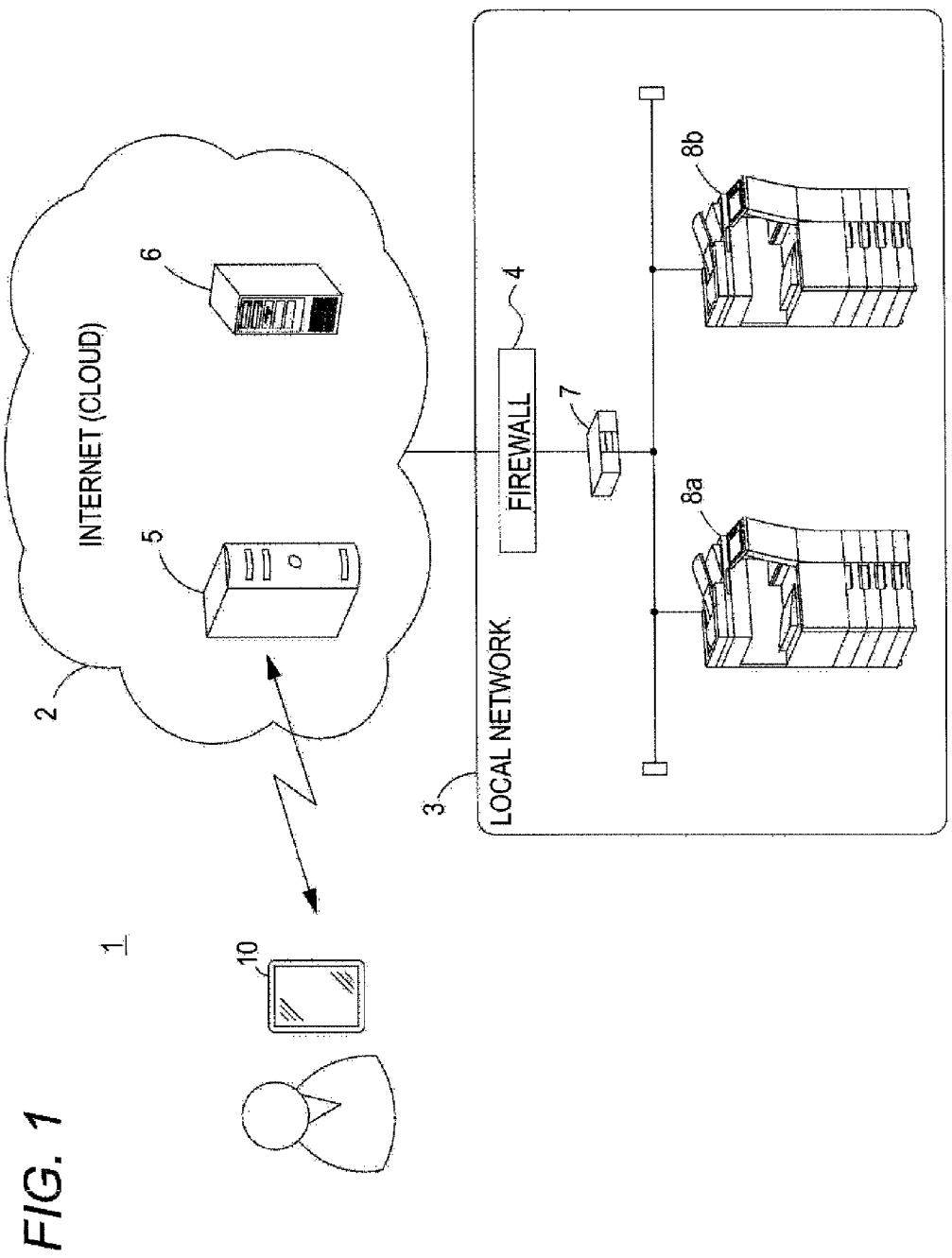
FIG. 1 is a diagram showing an example configuration of an image processing system in accordance with one or more embodiments of the invention.

Hereinafter, embodiments of the invention will be described in detail with reference to the drawings. However, the scope of the invention is not limited to the illustrated examples. Throughout the examples described below, like components are denoted by like reference numerals, and explanation of overlapping features among those components will not be made more than once.

FIG. 1 is a diagram showing an example configuration of an image processing system 1 in accordance with one or more embodiments of the invention. In a network environment where the Internet 2 and a local network 3 are connected via a firewall 4, this image processing system 1 has a configuration in which an application server 5 and a connection mediation server 6 are set in the Internet 2, and the firewall 4, a relay server 7, and image processing apparatuses 8a and 8b are set in the local network 3. Although more than one image processing apparatus is shown in the drawing, there may be only a single image processing apparatus.

The application server 5 is a server that provides various kinds of application services (cloud services) through SaaS (Software as a Service) applications, for example. Specifically, the application server 5 provides a storage service via the Internet 2, for example, and can store various kinds of data such as documents. An information processing terminal 10 can be connected to the application server 5 via the local network 3 or a different network from the local network 3, such as a public telephone network. The information processing terminal 10 can store data into the application server 5, and transmit jobs to the image processing apparatuses 8*a* and 8*b* in the local network 3 via the application server 5.

The connection mediation server 6 is a server that transmits, to the relay server 7, a request for a connection to the application server 5. Receiving a communication start request designating the image processing apparatus 8*a* or 8*b* from the application server 5, the connection mediation server 6 transmits a connection request to the relay server 7, to establish communication between the relay server 7 and the application server 5.

The firewall 4 is an interface that connects to the local network 3 such as a LAN to the Internet 2. When a device that is set in the local network 3 is connected to a server that is set in the Internet 2, the firewall 4 allows intercommunication between the device and the server. When the device in the local network 3 is not connected to the server in the Internet 2, the firewall 4 blocks access of the server to the local network 3.

The relay server 7 is a gateway server that is set in the local network 3 and relays communication between the image processing apparatus 8*a* or Bb and the application server 5. The image processing apparatuses 8*a* and 8*b* are formed with multifunction machines or printers, for example, and can perform image processing based on data that is input via the local network 3.

In the image processing system 1, when activated with power supply, the relay server 7 establishes a constant connection to the connection mediation server 6 in the Internet 2 via the firewall 4. Accordingly, receiving a communication start request from the application server 5, the connection mediation server 6 can transmit a connection request to the relay server 7 in the local network 3 over the firewall 4.

For example, a user connects to the application server 5 with the information processing terminal 10 such as a smartphone, a tablet terminal, or a personal computer, and issues a job execution instruction specifying scanning of a document or the like in the image processing apparatus 8*a*. In turn, the application server 5 transmits, to the connection mediation server 6, a communication start request designating the image processing apparatus 8*a*. Receiving the communication start request from the application server 5, the connection mediation server 6 transmits a connection request to the relay server 7. This connection request contains address information for connecting to the application server 5, and the like. For example, receiving the connection request from the connection mediation server 6, the relay server 7 generates a socket for connecting to the application server 5, and transmits an HTTP (Hypertext Transfer Protocol) request to the application server 5 via the socket. Receiving the HTTP request transmitted from the relay server 7, the application server 5 generates a socket for communicating with the relay server 7, and returns an HTTP response via the socket. With this, the relay server 7 and the application server 5 establish an HTTP session over the firewall 4. Such an HTTP session is generated for each job, for example. As the HTTP session is established, the relay server 7 and the application server 5 are connected to each other, establishing intercommunication. As a result, the application server 5 becomes able to transmit a job such as a scan job to the relay server 7, using the HTTP session established with the relay server 7 as the tunnel. Although an HTTP session is established between the relay server 7 and the application server 5 in this example, it may not be through an HTTP session that communication is established between the relay server 7 and the application server 5.

After establishing the communication with the application server 5, the relay server 7 receives a job from the application server 5, transfers the job to the image processing apparatus 8*a*, and relays communication between the application server 5 and the image processing apparatus 8*a*. Receiving the job transferred from the relay server 7, the image processing apparatus 8*a* executes the job, and performs scanning. There is a predetermined upper limit set on the number of connections the relay server 7 can simultaneously establish with the application server 5 in the Internet 2. Therefore, if the number of current connections to the application server 5 in the Internet 2 has not reached the upper limit when the relay server 7 receives a connection request from the connection mediation server 6, the relay server 7 connects to the application server 5. If the number of current connections has already reached the upper limit, on the other hand, the relay server 7 does not connect to the application server 5 even when receiving a connection request from the connection mediation server 6.

The relay server 7 also has a function to identify the type of a job received from the application server 5. Various types of jobs are transmitted from the application server 5 to the image processing apparatus 8*a*, and the frequency of data communication between the image processing apparatus 8*a* and the application server 5 through the above described HTTP session serving as a tunnel varies depending on the types of jobs. Therefore, if the relay server 7 identifies the type of a job as one involving a period during which no data communication is conducted between the application server 5 and the image processing apparatus 8*a*, the relay server 7 terminates the communication between the application server 5 and the image processing apparatus 8*a*. For example, in a case where a scan job received from the application server 5 is a job involving an OCR (Optical Character Recognition) process, the image processing apparatus 8*a* requires a predetermined time or longer before the end of execution of the job, performing the OCR process to recognize each one of the characters contained in the image data read through scanning. If a predetermined time or longer is required to execute a job as in this case, the relay server 7 temporarily terminates the connection to the application server 5. However, even if a job is identified as one that requires a predetermined time or longer before the end of execution thereof, termination of the connection in the middle of data transmission/reception between the application server 5 and the relay server 7 causes an error, as data cannot be appropriately transmitted/received. Therefore, when sensing that there is no data transmission/reception being performed with the application server 5, the relay server 7 terminates the connection. However, this termination of connection is not to appropriately terminate the above described HTTP session with both the relay server 7 and the application server 5. That is, the relay server 7 terminates the connection to the application server 5 by one-sidedly discarding the socket forming the HTTP session with application server 5, without notifying the application server 5 of the termination of the HTTP session.

If the relay server 7 temporarily terminates the connection to the application server 5, the relay server 7 maintains the connection-terminated state before receiving data to be transmitted to the application server 5 from the image processing apparatus 8a. After receiving data to be transmitted to the application server 5 from the image processing apparatus 8a, the relay server 7 reconnects to the application server 5, to reestablish the communication between the application server 5 and the image processing apparatus 8a, and transfer the data to the application server 5. In doing so, the relay server 7 again generates a socket for connecting to the application server 5, and incorporates the socket into an already-established HTTP session, to restore the connection to the application server 5, which has been temporarily terminated. As described above, when reestablishing connection, the relay server 7 does not establish a new HTTP session through the same procedures as those carried out when receiving a connection request from the connection mediation server 6, but reestablishes the same communication as before by restoring the HTTP session that has been temporarily discarded in a one-sided manner.

For example, in a case where scanning is performed in the image processing apparatus 8a, scan data generated through the scanning is transmitted to the relay server 7. Scan data may be collectively transmitted to the relay server 7 after all the pages to be scanned are read, or the scan data of one page may be transmitted to the relay server 7 every time one of the pages to be scanned is read. The relay server 7 may reconnect to the application server 5 and transfer the scan data of all the pages, after receiving the scan data of all the pages. Alternatively, the relay server 7 may reconnect to the application server 5 after receiving part of scan data (the scan data of the first page, for example), and transfer scan data to the application server 5 every time receiving scan data. Through such procedures, the relay server 7 can temporarily reduce the number of connections to the application server 5 by temporarily terminating the connection to the application server 5 between the time when receiving a job from the application server 5 and the time when receiving the data to be transmitted to the application server 5 from the image processing apparatus 8a. Accordingly, the relay server 7 can establish new communication for receiving a new job from the application server 5 in the Internet 2. Thus, communication efficiency can be improved while the number of connections to the application server 5 is kept within the upper limit.

Figure 2:
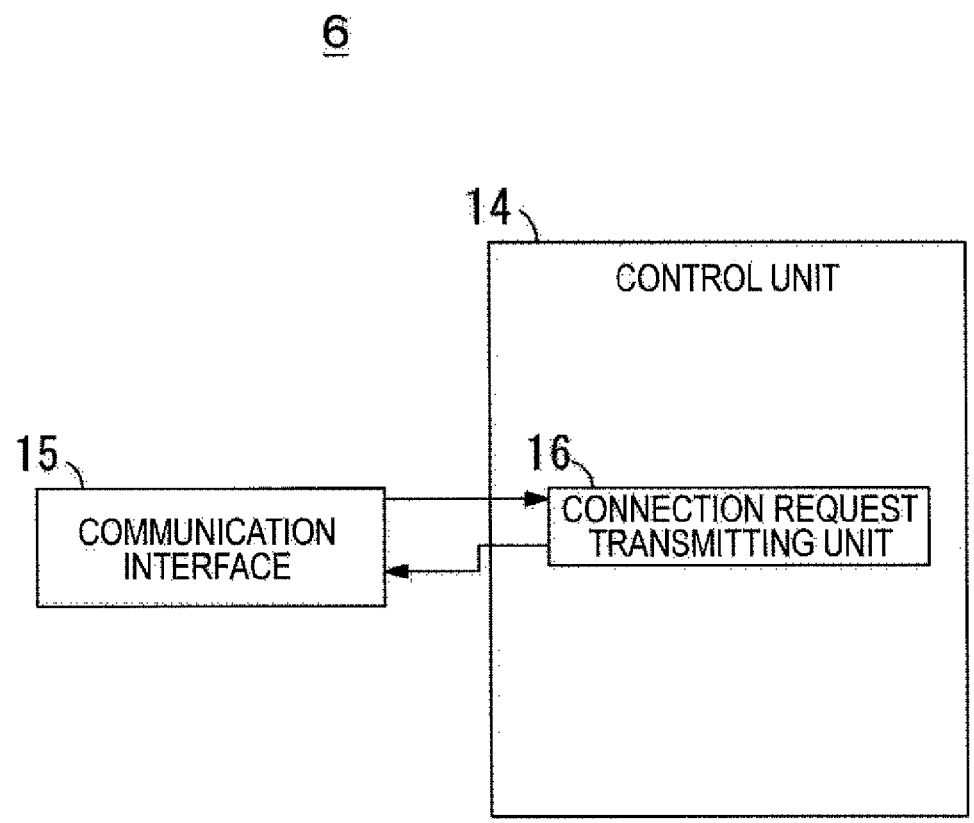
FIG. 2 is a block diagram showing an example of the functional structure of a connection mediation server in accordance with one or more embodiments of the invention.

Next, the respective functions of the connection mediation server 6 and the relay server 7 of the image processing system 1 are described. As shown in FIG. 2, the connection mediation server 6 includes a control unit 14 formed with a CPU and a memory, and a communication interface 15 for communicating with the application server 5 and the relay server 7. As the CPU executes a predetermined program, the control unit 14 functions as a connection request transmitting unit 16. The connection request transmitting unit 16 is a processing unit that transmits a connection request to the relay server 7 when the connection mediation server 6 receives a communication start request designating the image processing apparatus 8a or 8b from the application server 5. The connection request transmitting unit 16 then causes the relay server 7 to connect to the application server 5, to establish communication between the image processing apparatus 8a or 8b and the application server 5. This connection request contains the information about the image processing apparatus 8a or 8b designated as the output destination, and the address information for connecting to the application server 5. In addition to the address information about the application server 5, the connection request may contain the port number identifying the application that controls job-related communication. Since the connection mediation server 6 is constantly connected to the relay server 7, the connection request transmitting unit 16 transmits the connection request to the relay server 7, taking advantage of the constantly-connected state. Accordingly, the connection request is not blocked by the firewall 4, but is appropriately received by the relay server 7.

Figure 3:
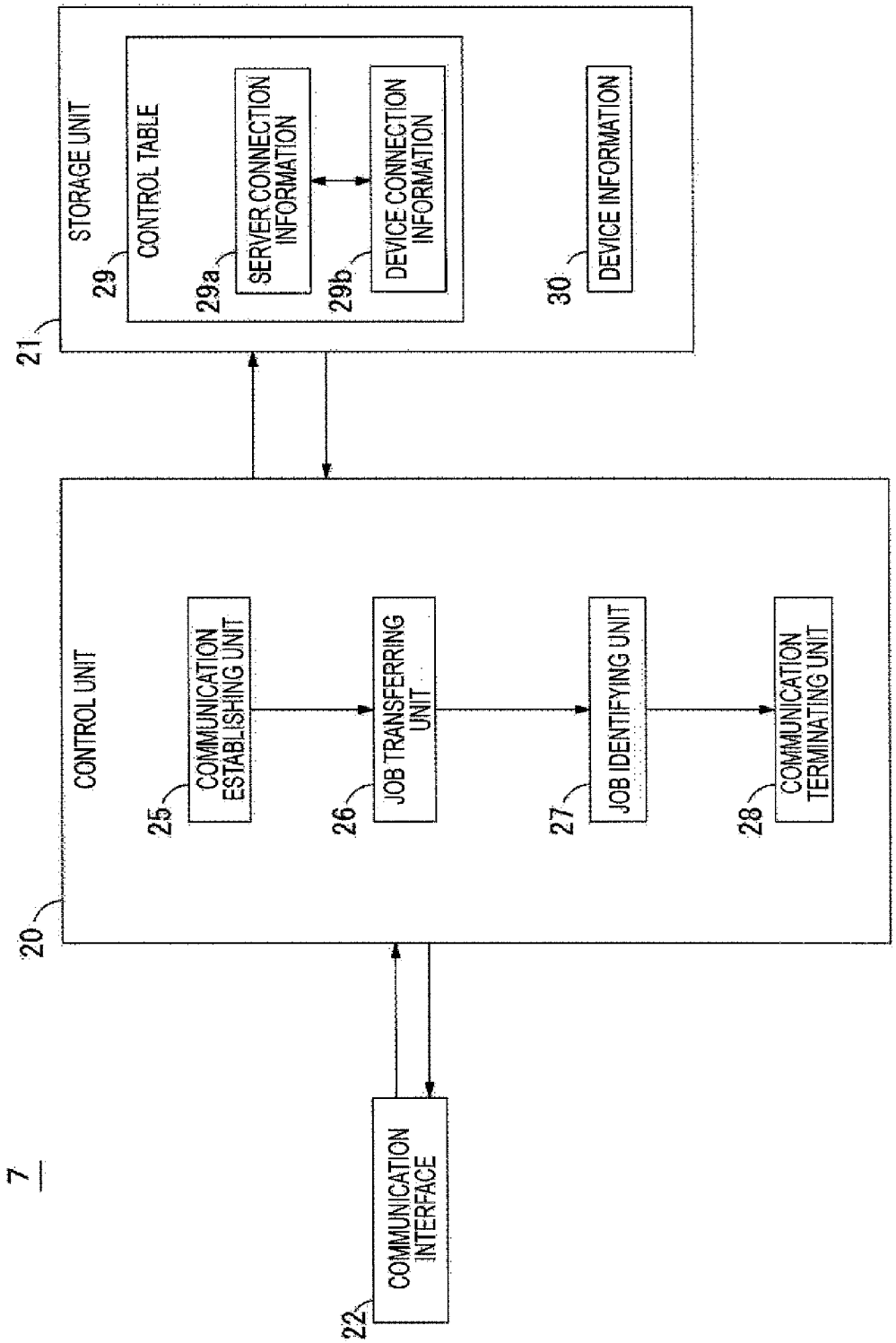
FIG. 3 is a block diagram showing an example of the functional structure of a relay server in accordance with one or more embodiments of the invention.

Next, the relay server 7 is described. FIG. 3 is a block diagram showing an example hardware configuration and an example functional structure of the relay server 7 in accordance with one or more embodiments of the invention. The relay server 7 includes a control unit 20 formed with a CPU and a memory, a storage unit 21 formed with a hard disk drive (HDD) or the like, and a communication interface 22 for conducting communication in the local network 3. As the CPU executes a predetermined program, the control unit 20 functions as a communication establishing unit 25, a job transferring unit 26, a job identifying unit 27, and a communication terminating unit 28.

The communication establishing unit 25 is a processing unit that connects to the application server 5 in accordance with a connection request received from the connection mediation server 6, and, after connecting to the application server 5, relays communication between the image processing apparatus 8a or 8b and the application server 5. Based on the address information about the application server 5 contained in the connection request, the communication establishing unit 25 transmits a connection start request such as an HTTP request to the application server 5. In turn, the application server 5 returns an HTTP response in reply to the connection start request, so that the relay server 7 connects to the application server 5. In a case where the connection request also contains a port number, the communication establishing unit 25 may transmit a connection start request, designating the application identified by the port number in the application server 5. In this case, the connection start request can be transmitted to a destination that is the application for controlling job-related communication in the application server 5. Accordingly, a connection can be accurately established. After the relay server 7 connects to the application server 5, a job that designates the image processing apparatus 8a or 8b as the output destination is transmitted from the application server 5 to the relay server 7. The job received from the application server 5 is then transferred from the job transferring unit 26 to the image processing apparatus 8a or 8b designated as the job output destination.

After the communication terminating unit 28 described later temporarily terminates the communication between the image processing apparatus 8a or 8b and the application server 5, the communication establishing unit 25 receives the data to be transmitted to the application server 5 from the image processing apparatus 8a or 8b, and then reconnects to the application server 5, to reestablish the communication between the image processing apparatus 8a or 8b and the application server 5, and transfer the data received from the image processing apparatus 8a or 8b to the application server 5. For example, receiving a notification of an end of print job execution from the image processing apparatus 8a or 8b, the communication establishing unit 25 reestablishes the connection to the application server 5, and transfers the notification of an end of print job execution to the application server 5. In a case where the job is a scan job, after receiving all or part of the scan data generated through the scan job from the image processing apparatus 8a or 8b, the relay server 7 reconnects to the application server 5, to transfer the received scan data. The application server 5 then notifies the user of the normal end of the job, or the data is then stored into the application server 5. The processing related to the job is thus completed.

The job identifying unit 27 is a processing unit that identifies the type of a job received from the application server 5. In a case where a connection to the application server 5 is established by the communication establishing unit 25, and a job that designates the image processing apparatus 8*a* is received from the application server 5, the job transferring unit 26 transfers the job to the image processing apparatus 8*a*. At the same time, the job identifying unit 27 performs a process of identifying the type of the job. The job identifying unit 27 identifies the type of the job such as a scan job or a print job by analyzing the setting information about the job, for example. In the case of a scan job, the job identifying unit 27 also determines whether the scan job is accompanied by a job that requires a certain processing time or longer for an OCR process or an image data compression process, for example. In the case of a print job, the job identifying unit 27 also identifies print settings, such as the number of pages, a paper size, a paper type, color or monochrome printing, and double-side printing.

In accordance with a job type identified by the job identifying unit 27, the communication terminating unit 28 determines whether the job causes no data transmission/reception between the application server 5 and the relay server 7 for a predetermined time or longer. If the job causes no data transmission/reception between the application server 5 and the relay server 7 for a predetermined time or longer, the communication terminating unit 28 temporarily terminates the communication between the application server 5 and the image processing apparatus 8*a* or 8*b* when no data is being transmitted/received between the application server 5 and the relay server 7. For example, in a case where the job type identified by the job identifying unit 27 is a scan job accompanied by a job that requires a certain processing time or longer for an OCR process or an image data compression process or the like, the communication terminating unit 28 terminates the connection to the application server 5 when no data is being transmitted/received between the application server 5 and the relay server 7 while such a scan job is being executed in the image processing apparatus 8*a* or 8*b*. In a case where the job type identified by the job identifying unit 27 is a print job, and the print settings include a certain setting, such as the number of pages being equal to or larger than a predetermined number, the paper size being equal to or larger than a predetermined size, the paper thickness being equal to or greater than a predetermined thickness, the print job being color printing or double-side printing, the communication terminating unit 28 terminates the connection to the application server 5 when no data is being transmitted/received between the application server 5 and the relay server 7 while such a print job is being executed in the image processing apparatus 8*a* or 8*b*. With this, between the start and the end of a job executed in the image processing apparatus 8*a* or 8*b*, the relay server 7 can establish a new connection to the application server 5 for a new job, so that the application server 5 outside the local network 3 can transmit a new job to the relay server 7. Alternatively, in accordance with the job type identified by the job identifying unit 27, the communication terminating unit 28 may estimate, through calculation, the time required between the start and the end of execution of the job, for example. If the estimated time is equal to or longer than a predetermined time, the communication terminating unit 28 may terminate the connection to the application server 5.

The storage unit 21 stores a control table 29 that is generated and managed by the communication establishing unit 25, and device information 30 related to the image processing apparatuses 8*a* and 8*b*. The control table 29 stores information in which a new connection (an HTTP session, for example) to the application server 5 established by the communication establishing unit 25 is recorded at the time of the establishment of the new connection, and the communication establishing unit 25 refers to the information when reconnecting to the application server 5 after the connection is terminated by the communication terminating unit 28. In the table information recorded in this control table 29, server connection information 29*a* identifying the application server 5 to be connected to in accordance with a connection request received from the connection mediation server 6 is associated, on a one-to-one basis, with device connection information 29*b* identifying the image processing apparatus 8*a* or 8*b* as the transfer destination of a job received from the application server 5. In the device information 30, the functions and the process capacities of the image processing apparatuses 8*a* and 8*b* as job transfer destinations are registered in advance.

FIG. 4 is a table showing an example of the control table 29 in accordance with one or more embodiments of the invention. The communication establishing unit 25 acquires, from a connection request, the address information and the like for connecting to the application server 5, and the address information and the like about the image processing apparatus 8*a* or 8*b* designated as the output destination. When establishing a new connection to the application server 5 based on the connection request, the communication establishing unit 25 registers the information for connecting to the application server 5 in the control table 29. Also, receiving a job from the application server 5 after establishing the new connection to the application server 5, the communication establishing unit 25 identifies the output destination of the job, and registers the information about the image processing apparatus as the output destination in the control table 29. The server connection information 29*a* identifying the application server 5 to be connected to include a connection ID, the application address indicating the address of the application server 5, and the application port number of the application that controls communication related to the job in the application server 5, for example. A connection flag indicating the current status of the current connection is also included in some cases. When the connection flag is ON, the application server 5 and the relay server 7 are connected to each other. When the connection flag is OFF, the application server 5 and the relay server 7 are temporarily disconnected from each other.

The device connection information 29*b* includes the device address identifying the device of the image processing apparatus 8*a* or 8*b* designated as the output destination, and the port number (device port number) of the relay server 7 connected to the device. The server connection information 29*a* and the device connection information 29*b* related to certain job transmission are associated with each other on a one-to-one basis, and are registered in the control table 29. Receiving the data to be transmitted to the application server 5 from the image processing apparatus 8*a* or 8*b* identified by the device connection information 29*b*, the communication establishing unit 25 restores the connection to the application server 5 identified by the server connection information 29*a* based on the server connection information 29*a* stored and associated with the device connection information 29b in the control table 29, and reestablishes the communication between the application server 5 and the image processing apparatus 8a or 8b. In a case where a notification of an end of print job execution is received from the image processing apparatus 8a, or where all or part of the scan data in a scan job is received from the image processing apparatus 8a, the communication establishing unit 25 refers to the control table 29, and identifies the current device connection information 29b based on the device address of the image processing apparatus 8a and the port number (device port number) of its own device that has received the notification of an end of job execution or the scan data. The communication establishing unit 25 then refers to the server connection information 29a associated with the current device connection information 29b. Based on the server connection information 29a, the communication establishing unit 25 restores the connection to the corresponding application server 5 to the same state as the state prior to the connection termination, and transfers the data received from the image processing apparatus 8a. By referring to the control table 29 described above, the communication establishing unit 25 promptly identifies the temporarily-terminated connection (an HTTP session, for example) to the application server 5, and restores the connection. In this manner, the communication establishing unit 25 can establish a reconnection to the application server 5. The server connection information 29a further includes the application port number identifying the application that controls communication related to the current job in the application server 5. Accordingly, even in a case where two or more jobs are transmitted from the same application server 5 to the relay server 7, and the communication terminating unit 28 temporarily terminates one of the connections to the application server 5 established for the respective jobs by the communication establishing unit 25, the application corresponding to the job can be identified, and a reconnection to the application server 5 can be established. Thus, a reconnection can be more efficiently realized.

Referring back to FIG. 3, the device information 30 is the information related to the image processing apparatuses 8a and 8b to be connected to the relay server 7 in the local network 3. For example, the device information 30 is acquired in advance when the relay server 7 connects to the image processing apparatuses 8a and 8b, and is stored into the storage unit 21. This device information 30 is referred to when the communication terminating unit 28 estimates the time required between the start and the end of job execution. For example, in the device information 30, information such as the functions and the processing capacities of the respective image processing apparatuses 8a and 8b is registered in advance as described above. Accordingly, the communication terminating unit 28 can accurately calculate the time required between the start and the end of execution of a job in the image processing apparatus 8a or 8b, by referring to the device information 30 based on the type of the job identified by the job identifying unit 27. If the calculated time is longer than a predetermined time, the communication terminating unit 28 determines to temporarily terminate the connection to the application server 5. Accordingly, in a case where a job received from the application server 5 is a job that requires a long processing time, the connection between the application server 5 and the relay server 7 is temporarily terminated, so that the application server 5 outside the local network 3 can be reconnected to the relay server 7 and transmit a new job to the relay server 7. However, in a case where a job type identified by the job identifying unit 27 is a predetermined type, the communication terminating unit 28 may determine whether to temporarily terminate the connection to the application server 5, regardless of the processing time calculated based on the device information 30.

Figure 5:
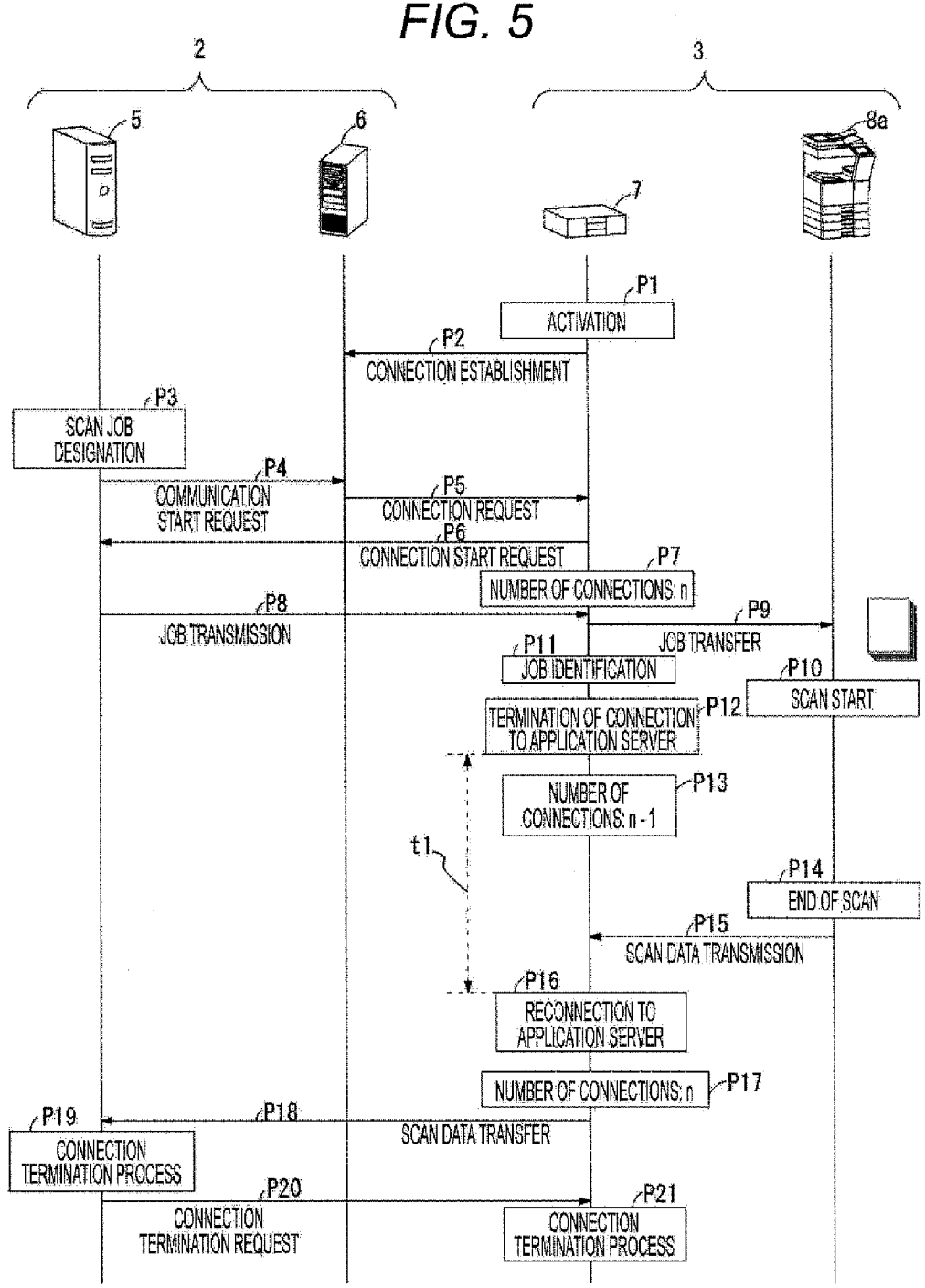
FIG. 5 is a diagram showing an outline of the flow of each process in a case where the relay server receives a scan job and transfers the scan job to an image processing apparatus, and the relay server also terminates a connection to an application server in accordance with one or more embodiments of the invention.

FIG. 5 is a diagram showing an outline of the flow of each process in a case where the relay server receives a scan job and transfers the scan job to an image processing apparatus, and the relay server also terminates a connection to an application server in accordance with one or more embodiments of the invention. First, when the relay server 7 is activated (process P1), the relay server 7 establishes a constant connection to the connection mediation server 6 (process P2). As a result, the connection mediation server 6 becomes able to transmit a connection request to the relay server 7 at any time. After that, when a scan job designating the image processing apparatus 8a as the output destination is designated in the application server 5 (process P3), the application server 5 transmits a communication start request to the connection mediation server 6 (process P4). Receiving this communication start request, the connection mediation server 6 transmits a connection request to the relay server 7 (process P5). Receiving the connection request, the relay server 7 transmits a connection start request to the application server 5 based on the address of the application server 5 and the like contained in the connection request (process P6), and connects to the application server 5 as the application server 5 accepts the connection start request. Connecting to the application server 5, the number of connections between the relay server 7 and the application server 5 outside the local network 3 becomes n (process P7). When the scan job is transmitted from the application server 5 to the relay server 7 (process P8), the relay server 7 transmits the scan job to the image processing apparatus 8a designated as the output destination (process P9). Receiving the scan job, the image processing apparatus 8a starts scanning a document or the like.

As well as transmitting the scan job to the image processing apparatus 8a (process P9 described above), the relay server 7 identifies the type of the scan job (process P11). In accordance with the identified job type, the relay server 7 temporarily terminates the connection when there is no transmission/reception being performed with the application server 5 (process P12). As to whether to temporarily terminate the connection to the application server 5, if the identified scan job is determined to be a job that involves a time-consuming process such as an OCR process or an image data compression process, the relay server 7 determines that no data transmission/reception will be performed between the application server 5 and the relay server 7 for a predetermined time or longer, and temporarily terminates the connection, while the scan job is being executed in the image processing apparatus 8a. Before the scan data generated as a result of execution of the scan job by the image processing apparatus 8a is received by the relay server 7, there is no data transmission/reception between the relay server 7 and the application server 5. Therefore, before the scan job is completed, by temporarily terminating the connection between the relay server 7 and the application server 5, the relay server 7 can connect to a server or the like outside the local network 3, so as to receive a new job from the server or the like. Thus, communication can be effectively used.

When temporarily terminating the connection to the application server 5 in process P12, the relay server 7 might do so by one-sidedly discarding the socket, without notifying the application server 5 of the termination of the HTTP session. If the application server 5 recognizes the termination of the HTTP session with the relay server 7, the application server 5 performs error processing on the assumption that an error occurred before the end of the scan job, and notifies the user that an error has occurred before the end of the job. In a case where the connection is temporarily terminated though the relay server 7 has not notified the application server 5 that the HTTP session is to be terminated, the application server 5 does not perform any error processing, not realizing that the connection to the relay server 7 is temporarily terminated. Therefore, the application server 5 does not notify the user that an error has occurred.

Temporarily terminating the connection to the application server 5 (process P12 described above), the relay server 7 subtracts one from the number of connections to the application server 5 (process P13). The connection flag in the corresponding server connection information 29a in the control table 29 is set to OFF, so that the registration is updated. During the period (t1) between process P12 and a reconnection to the application server 5 in process P16, which will be described later, the relay server 7 can establish a new connection to the application server 5, so as to receive a new job. When the image processing apparatus 8a completes the scanning (process P14), the image processing apparatus 8a transmits the generated scan data of all the pages to the relay server 7. In addition to that, the image processing apparatus 8a may also transmit a notification of an end of job execution (process P15). Receiving the scan data and the notification, the relay server 7 reconnects to the application server 5, so as to transfer the scan data (process P16). At this point, the relay server 7 again generates a socket, and incorporates the socket into an established HTTP session, to restore the temporarily-terminated connection. By doing so, the relay server 7 can reconnect to the application server 5, without causing the application server 5 to realize that the connection is temporarily terminated and a reconnection is then established. Thus, it is possible to prevent the application server 5 from performing error processing.

Reconnecting to the application server 5, the relay server 7 returns the number of current connections to the application server 5 to n (process P17). The connection flag in the corresponding server connection information 29a in the control table 29 is set to ON, so that the registration is updated. The scan data received from the image processing apparatus 8a is then transferred to the application server 5 (process P18). Receiving the scan data, the application server 5 performs the process of terminating the connection to the relay server 7 as the scan job has been completed (process P19), and transmits a connection termination request to the relay server 7 (process P20). Receiving the connection termination request, the relay server 7 also performs the process of terminating the connection to the application server 5 (process P21).

Figure 6:
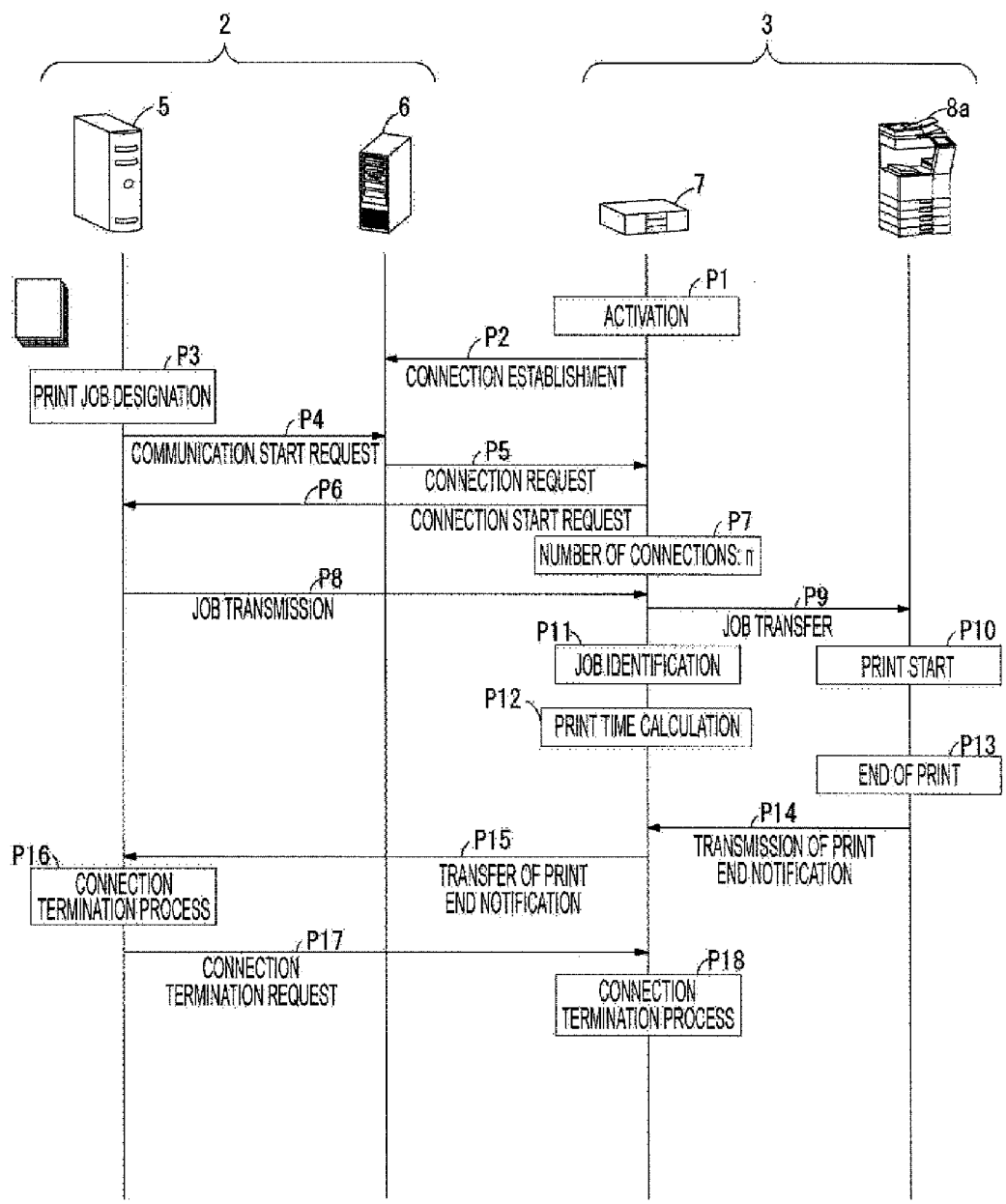
FIG. 6 is a diagram showing an outline of the flow of each process in a case where the relay server calculates a print processing time and maintains a connection to the application server, when the relay server receives a print job and transfers the print job to an image processing apparatus in accordance with one or more embodiments of the invention.

FIG. 6 is a diagram showing an outline of the flow of each process in a case where the relay server calculates a print processing time and maintains a connection to the application server 5, when the relay server receives a print job and transfers the print job to the image processing apparatus 8a in accordance with one or more embodiments of the invention. First, when the relay server 7 is activated (process P1), the relay server 7 establishes a constant connection to the connection mediation server 6 (process P2). After that, when the application server 5 designates a print job indicating the image processing apparatus 8a as the output destination (process P3), the application server 5 transmits a communication start request to the connection mediation server 6, designating the image processing apparatus 8a as the output destination (process P4). Receiving the connection start request, the connection mediation server 6 transmits a connection request to the relay server 7 (process P5). Receiving the connection request, the relay server 7 transmits a connection start request to the application server 5 based on the address of the application server 5 and the like contained in the connection request (process P6), and connects to the application server 5 by establishing an HTTP session. As a result, the number of connections between the relay server 7 and a server or the like outside the local network 3 becomes n (process P7). When the print job is transmitted from the application server 5 to the relay server 7 (process P8), the relay server 7 transmits the print job to the image processing apparatus 8a (process P9). Receiving the print job, the image processing apparatus 8a starts printing (process P10). Meanwhile, the relay server 7 identifies the type of the print job (process P11). The relay server 7 analyzes the setting information about the print job, to determine the number of pages to be printed, the paper size, and existence/non-existence of color print setting. After determining the contents of the identified job, the relay server 7 refers to the device information 30 in the storage unit 21, and calculates the time required for executing the print job (process P12). If the calculated time required for executing the job is equal to or longer than a predetermined time, the relay server 7 can temporarily terminate the connection to the application server 5 before the relay server 7 receives a notification of an end of job execution from the image processing apparatus 8a. In the example shown in FIG. 6, however, the time required for executing the print job is equal to or shorter than the predetermined time, and therefore, the relay server 7 does not temporarily terminate the connection to the application server 5. In a case where the time required for job execution is not equal to or longer than the predetermined time as in this case, soon after the connection to the application server 5 is temporarily terminated, a reconnection needs to be established, and communication is not effectively used. Therefore, the complicated process of establishing a reconnection immediately after the connection to the application server 5 is temporarily terminated is avoided, and the connection to the application server 5 can be maintained.

When the printing is completed in the image processing apparatus 8a (process P13), the image processing apparatus 8a transmits a print end notification to the relay server 7 (process P14), and the relay server 7 transfers the received print end notification to the application server 5 (process P15). With this, the application server 5 recognizes that the print job has been appropriately completed, and notifies the user to that effect. The application server 5 then performs the process of terminating the connection to the relay server 7 as the print job has been completed (process P16), and transmits a connection termination request to the relay server 7 (process P17). In reply to the connection termination request, the relay server 7 performs the process of terminating the connection to the application server 5 (process P18).

Figure 7:
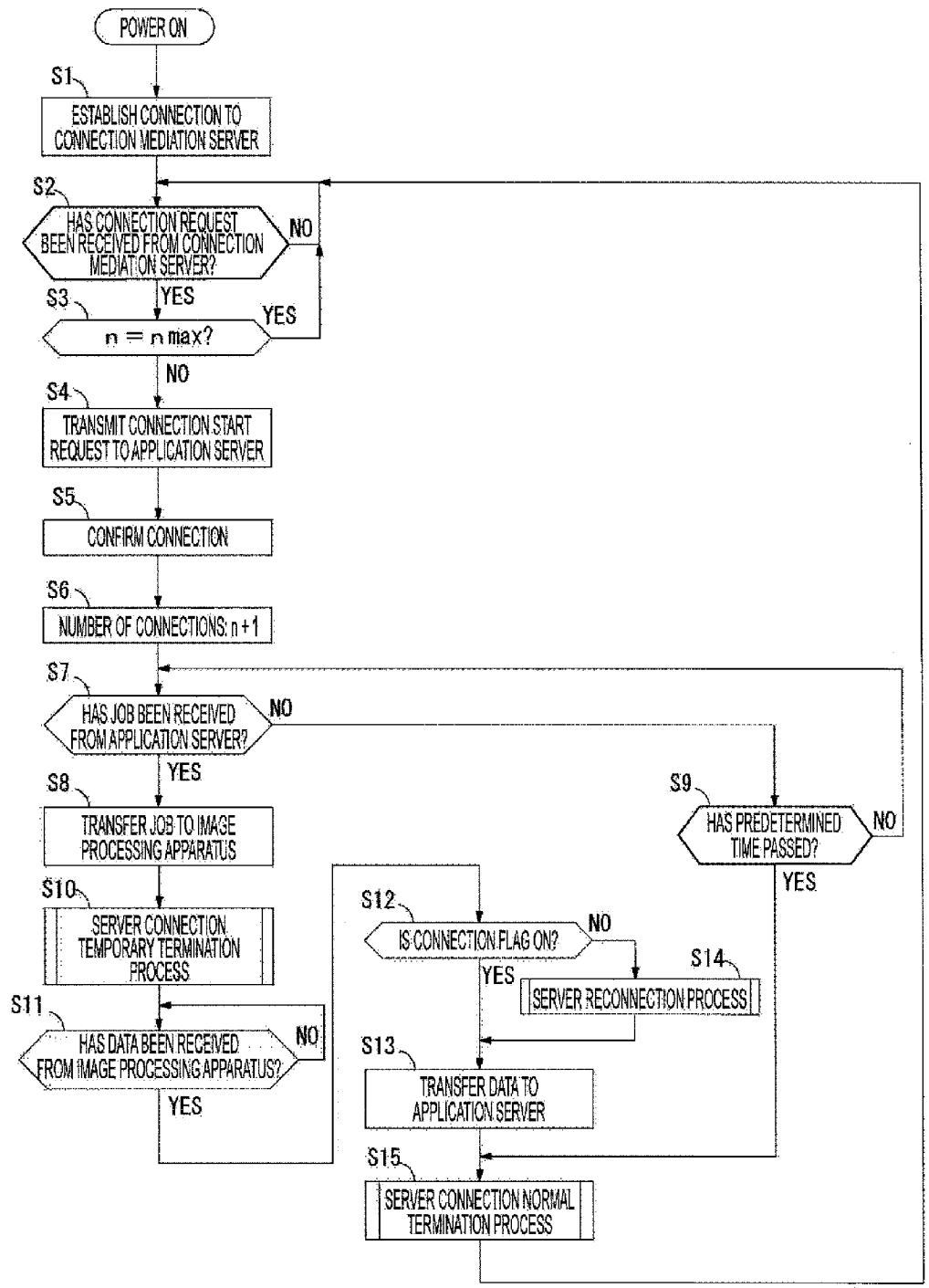
FIG. 7 is a flowchart showing an example of processing procedures to be carried out by the relay server in accordance with one or more embodiments of the invention.

Referring now to FIG. 7, a specific example of processing procedures in the relay server 7 in accordance with one or more embodiments of the invention is described. The flowchart shown in FIG. 7 is a flowchart showing an example of processes related to a job transmitted to the relay server 7 from a server or the like in the Internet, and an example case where a job is transmitted from the application server 5 to the relay server 7 is described below. When power is supplied, the relay server 7 establishes a connection to the connection mediation server 6, and maintains the connection until the power supply is cut off (step S1). After establishing the connection to the connection mediation server 6, the relay server 7 determines whether the relay server 7 has received a connection request for a connection to the application server 5 from the connection mediation server 6 (step S2). If the relay server 7 has not received a connection request (NO in step S2), the relay server 7 awaits reception of a connection request. If the relay server 7 determines that it has received a connection request (YES in step S2), the relay server 7 determines whether the current number (n) of connections to a server or the like outside the local network 3 is the upper limit (nmax) of the number of connections the relay server 7 can establish (step S3). The relay server 7 functions as a gateway that relays communication between a device such as the image processing apparatus 8a or 8b set in the local network 3 and a server or the like in the Internet. There is an upper limit on the number of connections to the application server 5, as described above. If the relay server 7 determines that the current number (n) of connections is not the upper limit (nmax) (NO in step S3), the relay server 7 transmits a connection start request to the application server 5 (step S4), and confirms establishment of a connection to the application server 5, receiving an HTTP response from the application server 5 (step S5). The relay server 7 then adds 1 to the current number (n) of connections to the application server 5 (step S6). The relay server 7 also updates the control table 29 by adding the information for connecting to the application server 5 to the server connection information 29a in the control table 29. If the relay server 7 determines that the current number (n) of connections is the upper limit (n=nmax) of the number of connections the relay server 7 can establish (YES in step S3), the relay server 7 does not transmit a connection start request to the application server 5, but continues to await reception of a connection request.

When connecting to the application server 5, the relay server 7 determines whether the relay server 7 has received a job from the application server 5 (step S7). If the relay server 7 determines that it has received a job (YES in step S7), the relay server 7 transfers the job to the image processing apparatus 8a designated as the output destination, for example (step S8). The relay server 7 also updates the control table 29 by adding the information about the image processing apparatus 8a as the output destination of the job to the device connection information 29b in the control table 29. After transferring data to the image processing apparatus 8a, the relay server 7 performs a server connection temporary termination process to temporarily terminate the connection to the application server 5 (step S10). The server connection temporary termination process will be described later in detail. The relay server 7 next determines whether the relay server 7 has received scan data generated through job execution and a notification of an end of job execution from the image processing apparatus 8a to which the job has been transferred (step S11). If the relay server 7 determines that it has not received scan data generated through job execution and a notification of an end of job execution or the like from the image processing apparatus 8a (NO in step S11), the relay server 7 awaits reception of scan data and a notification. If the relay server 7 determines that it has received scan data and a notification of an end of job execution or the like from the image processing apparatus 8a (YES in step S1), on the other hand, the relay server 7 identifies the device connection information 29b corresponding to the job by referring to the control table 29, and determines whether the connection flag is ON by referring to the server connection information 29a registered and associated with the corresponding device connection information 29b on a one-to-one basis (step S12). If the relay server 7 determines that the connection flag is ON (YES in step S12), the connection between the application server 5 and the relay server 7 is maintained, and therefore, the relay server 7 transfers the scan data and the notification of an end of job execution received from the image processing apparatus 8a, to the application server 5 (step S13). If the relay server 7 determines that the connection flag is OFF (NO in step S12), on the other hand, the connection between the application server 5 and the relay server 7 is temporarily terminated. Therefore, the relay server 7 performs a server reconnection process for reconnecting to the application server 5 (step S14). After reconnecting to the application server 5, the relay server 7 transfers the data received from the image processing apparatus 8a (step S13). The server reconnection process will be described later in detail.

After transferring the data and the notification of an end of job execution received from the image processing apparatus 8a to the application server 5 in step S13, the relay server 7 performs a server connection normal termination process to terminate the connection to the application server 5 (step S15). The server connection normal termination process will be described later in detail. After performing the server connection normal termination process (step S15), the relay server 7 awaits reception of a new connection request from the connection mediation server 6.

If the relay server 7 determines in step S7 that it has not received a job from the application server 5 (NO in step S7), the relay server 7 determines whether a predetermined time has passed (step S9). If the relay server 7 determines that the predetermined time has not passed yet (NO in step S9), the relay server 7 returns to step S7, and determines whether it has received a job from the application server 5. If the relay server 7 determines that the predetermined time has passed without reception of a job from the application server 5 (YES in step S9), the relay server 7 skips the processes in steps S8 to S13, and performs the server connection normal termination process to terminate the connection to the application server 5 (step S15). If the relay server 7 does not receive a job from the application server 5 within the predetermined time, the relay server 7 terminates the connection, so that a connection can be established to allow the application server 5 to transmit a new job to the relay server 7. Accordingly, effective use of communication is facilitated.

Figure 8:
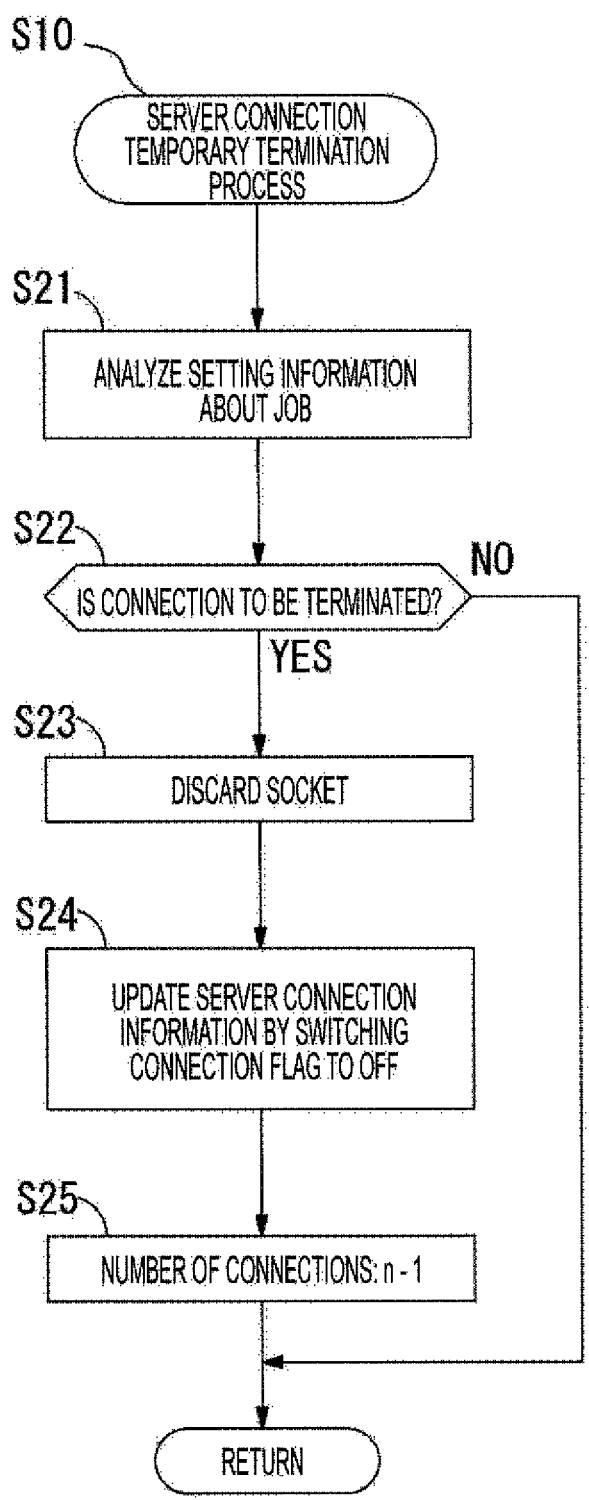
FIG. 8 is a flowchart showing a specific example of the processing procedures in a server connection temporary termination process in accordance with one or more embodiments of the invention.

FIG. 8 is a flowchart showing a specific example of the processing procedures in the server connection temporary termination process (step S10 in FIG. 7) in accordance with one or more embodiments of the invention. The relay server 7 first analyzes the setting information about the job received from the application server 5 (step S21). Taking into account the results of the analysis of the job, the relay server 7 determines whether to temporarily terminate the connection to the application server 5 (step S22). As for the criteria in determining whether to terminate the connection, if the relay server 7 determines that a predetermined time or longer is required between the time when the relay server 7 transfers the job to the image processing apparatus 8a and the time when the relay server 7 receives the data to be transmitted to the application server 5 as a result of the job executed by the image processing apparatus 8, the relay server 7 may determine to temporarily terminate the connection to the application server 5. It should be noted that the specific method of determining whether the predetermined time or longer is required to receive the data may differ among jobs. In the case of a print job, for example, a notification of an end of job execution is transmitted from the image processing apparatus 8a to the relay server 7 after the end of the print job. By referring to the device information 30 related to the image processing apparatus 8a as the output destination, the relay server 7 calculates the time required to execute the print job, and may determine whether the predetermined time or longer is required to receive the data, depending on whether the calculated job execution time is equal to or longer than a predetermined time. In an example case of a scan job, the relay server 7 may determine whether the predetermined time or longer is required to receive the data, depending on whether the scan job involves a time-consuming process such as an OCR process or an image data compression process.

If the relay server 7 determines not to temporarily terminate the connection to the application server 5 (NO in step S22), the relay server 7 ends the server connection temporary termination process. If the relay server 7 determines to temporarily terminate the connection to the application server 5 (YES in step S22), on the other hand, the relay server 7 one-sidedly discards the socket generated for establishing the HTTP session with the application server 5 (step S23). With this, the HTTP session with the application server 5 comes to an end. As the relay server 7 terminates the HTTP session by one-sidedly discarding the socket without notifying the application server 5 of the termination, the application server 5 does not recognize that the connection to the relay server 7 is temporarily terminated. Accordingly, the application server 5 can be prevented from performing error processing. After discarding the socket, the relay server 7 updates the server connection information 29a by switching the connection flag from ON to OFF in the server connection information 29a in the control table 29 (step S24). The relay server 7 then subtracts one from the current number (n) of connections between the relay server 7 and the application server 5 (step S25), and ends the server connection temporary termination process. Accordingly, while the connection between the relay server 7 and the application server 5 is temporarily terminated, a new connection can be established to allow the application server 5 to transmit a new job to the relay server 7.

Figure 9:
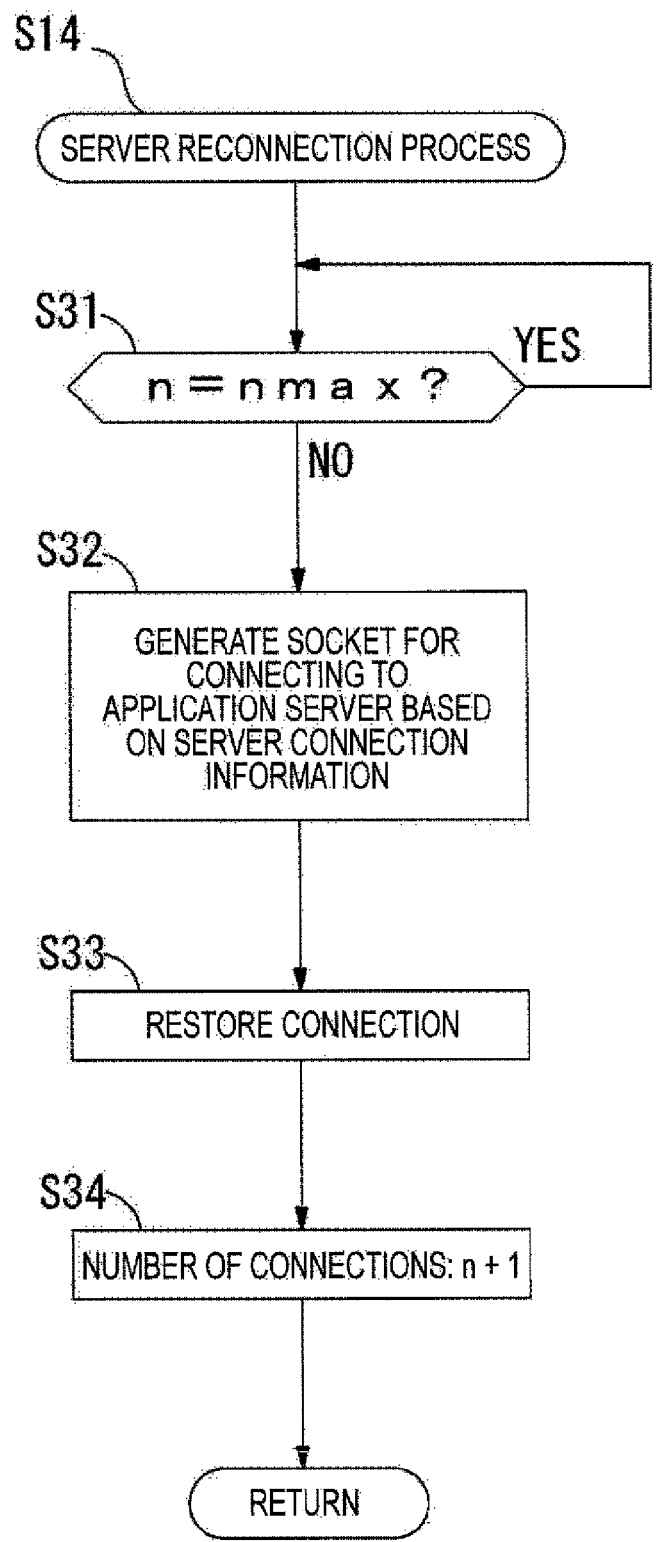
FIG. 9 is a flowchart showing a specific example of the processing procedures in a server reconnection process in accordance with one or more embodiments of the invention.

FIG. 9 is a flowchart showing a specific example of the processing procedures in the server reconnection process (step S14 in FIG. 7) in accordance with one or more embodiments of the invention. The relay server 7 first determines whether the current number (n) of connections between the relay server 7 and the application server 5 is the upper limit (nmax) of the number of connections the relay server 7 can establish (step S31). If the relay server 7 determines that the current number of connections is the upper limit (n=nmax) of the number of connections that can be established (YES in step S31), the relay server 7 is not able to establish a new connection to the application server 5 in the Internet, and therefore, awaits until the current number of connections becomes smaller than the upper limit of the number of connections that can be established. If the relay server 7 determines that the current number of connections is not the upper limit of the number of connections that can be established (NO in step S31), the relay server 7 generates a socket for connecting to the application server 5 based on the server connection information 29a associated on a one-to-one basis with the device connection information 29b in the control table 29 related to the connection between the image processing apparatus 8a that has received the job and the relay server 7 (step S32). The relay server 7 then restores the connection by incorporating the generated socket into an already-established HTTP session with the application server 5 (step S33), and adds one to the current number of connections between the relay server 7 and the application server 5 (step S34). In this manner, the relay server 7 can promptly identify a server or the like to be reconnected to, by referring to the device connection information 29b in the control table 29 and the server connection information 29a registered and associated with the device connection information 29b. Particularly, in a case where the server connection information 29a further includes the application port number identifying the application that controls communication related to the current job in the application server 5, if the application server 5 and the relay server 7 are processing two or more jobs, and there are two or more connections existing between the two servers, the relay server 7 can identify the application that controls communication related to the current job, and accurately reconnect to the application server 5.

Figure 10:
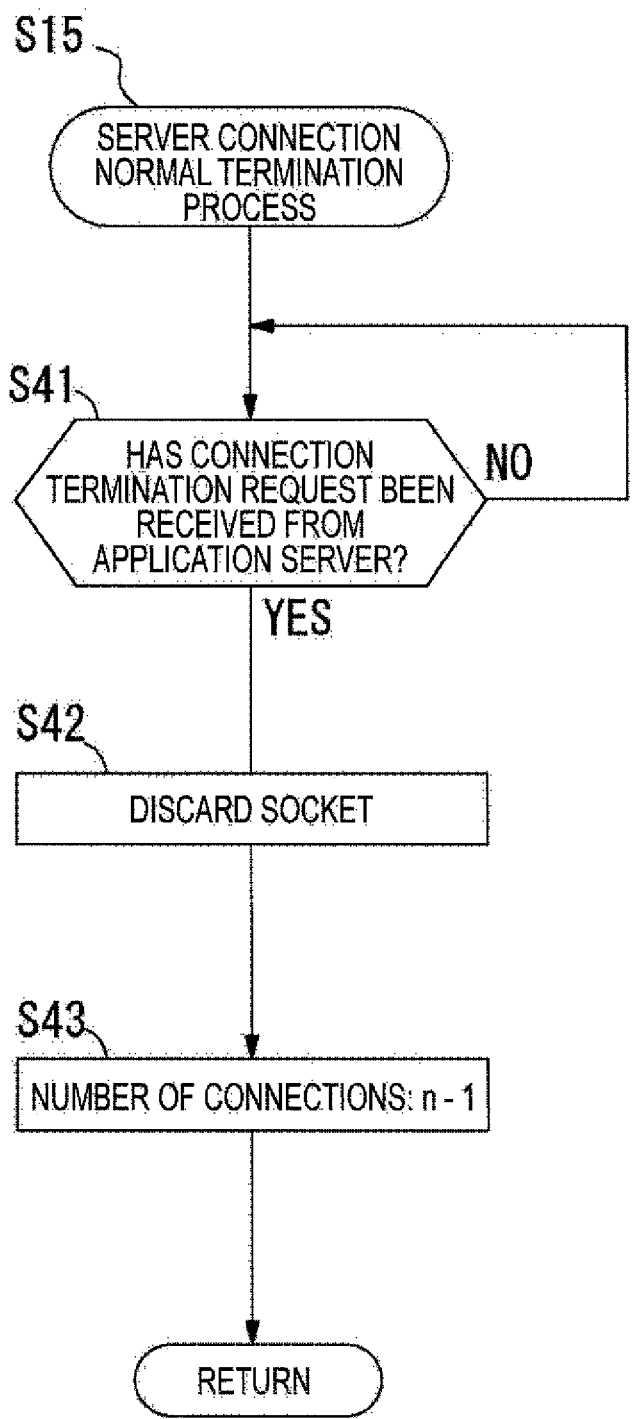
FIG. 10 is a flowchart showing a specific example of the processing procedures in a server connection normal termination process in accordance with one or more embodiments of the invention.

FIG. 10 is a flowchart showing a specific example of the processing procedures in the server connection normal termination process (step S15 in FIG. 7) in accordance with one or more embodiments of the invention. The relay server 7 first determines whether the relay server 7 has received a connection termination request from the application server 5 (step S41). When the data received by the relay server 7 from the image processing apparatus 8a and a notification of an end of job execution are transferred to the application server 5 (equivalent to step S13 in FIG. 7), the application server 5 determines that the job has been appropriately completed, and performs the process of terminating the connection between the application server 5 and the relay server 7. The application server 5 then transmits a connection termination request to the relay server 7. Alternatively, if the application server 5 performs the termination process prior to job transmission to the relay server 7 (equivalent to YES in step S9 in FIG. 7), the application server 5 transmits a connection termination request to the relay server 7.

If the relay server 7 determines that it has not received a connection termination request from the application server 5 (NO in step S41), the relay server 7 awaits until reception of a connection termination request. If the relay server 7 determines that it has received a connection termination request (YES in step S41), on the other hand, the relay server 7 discards the socket generated for connecting to the application server 5 (step S42), and subtracts one from the current number (n) of connections between the relay server 7 and the application server 5. The relay server 7 then ends the server connection normal termination process.

As described so far, in the image processing system 1 in accordance with one or more embodiments of the invention, the relay server 7 temporarily terminates a connection to the application server 5 in accordance with the type of a job received through the connection to the application server 5. After receiving the data to be transmitted to the application server 5 from the image processing apparatus 8a, the relay server 7 reconnects to the application server 5. Accordingly, the number of connections the relay server 7 can establish with the application server 5 can be increased by one before the relay server 7 receives the data from the image processing apparatus 8a. Thus, effective use of communication can be facilitated.

Although embodiments of the present invention have been described so far, the invention is not limited to the above described specific examples of the embodiments, and various modifications can be made to them.

For example, in the above described embodiments, the relay server 7 relays communication between an image processing apparatus or the like in the local network 3 and the application server 5 in the Internet. However, an image processing apparatus such as a multifunction printer may include the above described functions of the relay server 7.

According to embodiments of the present invention, a relay server terminates a connection between an application server and the relay server in accordance with the type of a job received from the application server. After receiving the data to be transmitted to the application server from an image processing apparatus, the relay server reconnects to the application server, and transfers the data. In this structure, while the connection between the application server and the relay server is terminated, new communication for transmitting a new job can be established between a server or the like in the Internet and the relay server. Accordingly, jobs can be efficiently transmitted, and effective use of communication can be facilitated.

Although embodiments of the invention have been described and illustrated in detail, it is clearly understood that the same is by way of illustrated and example only and is not to be taken by way of limitation, the scope of the present invention being interpreted by terms of the appended claims.

Further, the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing system comprising:
   an application server connected to the Internet;
   an image processing apparatus connected to a local network, wherein the local network is connected to the Internet via a firewall;
   a relay server that relays communication between the image processing apparatus and the application server, wherein the relay server is connected to the local network; and
   a connection mediation server that transmits, to the relay server, a request for a connection to the application server, wherein the connection mediation server is connected to the Internet,
   wherein
   the connection mediation server comprises a connection request transmitting unit that transmits a connection request to the relay server in response to receiving a communication start request from the application server, and the communication start request designates the image processing apparatus to establish communication between the image processing apparatus and the application server,
   the relay server comprises:
      a communication establishing unit that establishes the communication by connecting to the application server based on the connection request from the connection mediation server;
      a job transferring unit that transfers a job received from the application server to the image processing apparatus;
      a job identifying unit that identifies a type of the job; and
      a communication terminating unit that terminates the communication based on the type of the job identified by the job identifying unit, and
      after the communication terminating unit terminates the communication, the communication establishing unit reestablishes the communication by connecting to the application server after receiving data to be transmitted to the application server from the image processing apparatus, and transfers the data.

2. The image processing system according to claim 1, wherein, when determining that a predetermined time or longer is required between transfer of the job to the image processing apparatus and reception of the data, the communication terminating unit terminates the communication.

3. The image processing system according to claim 1, wherein the communication terminating unit terminates the communication without notifying the application server.

4. The image processing system according to claim 3, wherein
   the communication establishing unit generates a socket for connecting to the application server based on reception of the connection request from the connection mediation server, and establishes the communication, and
   the communication terminating unit terminates the communication by discarding the socket.

5. The image processing system according to claim 3, wherein the communication establishing unit reestablishes the communication without notifying the application server.

6. The image processing system according to claim 1, wherein
   the relay server further comprises
   a storage unit that stores server connection information identifying the application server to be connected to in accordance with the connection request, and device connection information identifying the image processing apparatus to be connected to for transferring the job received from the application server, the server connection information and the device connection information being associated with each other, and,
   when receiving a notification of completion of the job from the image processing apparatus identified by the device connection information, the communication establishing unit reestablishes the communication by connecting to the application server based on the server connection information stored and associated with the device connection information in the storage unit.

7. A relay server that is connected to a local network connected to the Internet via a firewall, connects to a connection mediation server connected to the Internet, connects to an application server connected to the Internet based on a connection request received from the connection mediation server, and relays communication between an image processing apparatus connected to the local network and the application server,
   the relay server comprising:
      a communication establishing unit that establishes communication between the image processing apparatus and the application server by connecting to the application server based on the connection request from the connection mediation server;
      a job transferring unit that transfers a job received from the application server to the image processing apparatus;
      a job identifying unit that identifies a type of the job; and a communication terminating unit that terminates the communication based on the type of the job identified by the job identifying unit, wherein, after the communication terminating unit terminates the communication, the communication establishing unit reestablishes the communication by connecting to the application server after receiving data to be transmitted to the application server from the image processing apparatus, and transfers the data.

8. The relay server according to claim 7, wherein, when determining that a predetermined time or longer is required between transfer of the job to the image processing apparatus and reception of the data, the communication terminating unit terminates the communication.

9. The relay server according to claim 7, wherein the communication terminating unit terminates the communication, without notifying the application server.

10. The relay server according to claim 9, wherein
the communication establishing unit generates a socket for connecting to the application server based on reception of the connection request from the connection mediation server, and establishes the communication, and
the communication terminating unit terminates the communication by discarding the socket.

11. The relay server according to claim 9, wherein the communication establishing unit reestablishes the communication without notifying the application server.

12. The relay server according to claim 7, further comprising
a storage unit that stores server connection information identifying the application server to be connected to in accordance with the connection request, and device connection information identifying the image processing apparatus to be connected to for transferring the job received from the application server, the server connection information and the device connection information being associated with each other,
wherein, when receiving a notification of completion of the job from the image processing apparatus identified by the device connection information, the communication establishing unit reestablishes the communication by connecting to the application server based on the server connection information stored and associated with the device connection information in the storage unit.

13. A non-transitory recording medium storing a computer readable program to be executed by a computer functioning as a relay server that is connected to a local network connected to the Internet via a firewall, connects to a connection mediation server connected to the Internet, connects to an application server connected to the Internet based on a connection request received from the connection mediation server, and relays communication between an image processing apparatus located in the local network and the application server,
wherein the program causes the computer to carry out:

(a) establishing communication between the image processing apparatus and the application server by connecting to the application server based on the connection request from the connection mediation server;
(b) transferring a job received from the application server to the image processing apparatus;
(c) identifying a type of the job;
(d) terminating the communication based on the type of the job identified in (c); and
(e) reestablishing the communication to transfer data to the application server by connecting to the application server after terminating the communication in (d) and receiving the data from the image processing apparatus.

14. The non-transitory recording medium storing a computer readable program according to claim 13, wherein, when determining that a predetermined time or longer is required between transfer of the job to the image processing apparatus and reception of the data in (d), the computer terminates the communication.

15. The non-transitory recording medium storing a computer readable program according to claim 13, wherein, in (d), the computer terminates the communication, without notifying the application server.

16. The non-transitory recording medium storing a computer readable program according to claim 15, wherein,
in (a), the computer generates a socket for connecting to the application server based on reception of the connection request from the connection mediation server, and establishes the communication, and,
in (d), the computer terminates the communication by discarding the socket.

17. The non-transitory recording medium storing a computer readable program according to claim 15, wherein, in (e), the computer reestablishes the communication, without notifying the application server.

18. The non-transitory recording medium storing a computer readable program according to claim 13, wherein
the program further causes the computer to carry out
(f) storing server connection information identifying the application server to be connected to in accordance with the connection request, and device connection information identifying the image processing apparatus to be connected to for transferring the job received from the application server, the server connection information and the device connection information being associated with each other, and,
in (e), when receiving a notification of completion of the job from the image processing apparatus identified by the device connection information, the computer reestablishes the communication by connecting to the application server based on the server connection information stored and associated with the device connection information in the storage unit.

* * * * *